(12) United States Patent
Iwamoto

(10) Patent No.: US 7,509,031 B2
(45) Date of Patent: Mar. 24, 2009

(54) OPTICAL DISK RECORDER AND METHOD OF WRITING SIGNAL TO AN OPTICAL DISK

(75) Inventor: Atsushi Iwamoto, Daito (JP)

(73) Assignee: Funai Electric Co., Ltd., Daito-shi (JP)

(*) Notice: Subject to any disclaimer, the term of this patent is extended or adjusted under 35 U.S.C. 154(b) by 884 days.

(21) Appl. No.: 11/105,399

(22) Filed: Apr. 14, 2005

(65) Prior Publication Data
US 2005/0232613 A1  Oct. 20, 2005

(30) Foreign Application Priority Data
Apr. 14, 2004 (JP) ............................ 2004-118456

(51) Int. Cl.
*H04N 5/00* (2006.01)
(52) U.S. Cl. .................. 386/126; 386/125; 386/124
(58) Field of Classification Search ............. 386/125, 386/126
See application file for complete search history.

(56) References Cited
FOREIGN PATENT DOCUMENTS

| | | |
|---|---|---|
| JP | 2002-203363 | 7/2002 |
| JP | 2003-217227 | 7/2003 |
| JP | 2003-281745 | 10/2003 |

*Primary Examiner*—Thai Tran
*Assistant Examiner*—Girumsew Wendmagegn
(74) *Attorney, Agent, or Firm*—Crowell & Moring LLP

(57) ABSTRACT

In an optical disk recorder, an optimum threshold value (M') of a front-end buffer is calculated from data size, signal transfer rate (Rt) and signal write rate (Rw). Writing the signal to the optical disk is performed multiple times each immediately after the storage amount reaches the optimum threshold value (M'), while continuing buffer storage to the front-end buffer. By performing the writing, time (T3) at which the signal transfer from a back-end buffer to the front-end buffer is ended can be made substantially simultaneous with time (T4) at which the signal writing by an optical pickup is ended, whereby time required for signal writing can be reduced.

4 Claims, 4 Drawing Sheets

OPTICAL DISK RECORDER AND METHOD OF WRITING SIGNAL TO AN OPTICAL DISK

BACKGROUND OF THE INVENTION

1. Field of the Invention

The present invention relates to an optical disk recorder for recording television broadcast signals on an optical disk, and a method of writing signal to the optical disk.

2. Description of the Related Art

In the prior art, an optical disk recorder for recording television broadcast signals on an optical disk such as DVD (Digital Versatile Disk) has been put to practical use. Usually, such optical disk recorder comprises a back-end buffer (hereafter referred to as "BE buffer") and a front-end buffer (hereafter referred to as "FE buffer"). The broadcast signals received by a tuner are output to an optical pickup as appropriately, while being sequentially buffered in the BE buffer and the FE buffer.

In the optical disk recorder, the broadcast signals are recorded in accordance with a video recording standard. Optical disks capable of recording, using the optical disk recorder, include those to which signals are rewritable. If signals are frequently rewritten to such rewritable optical disks, recorded and unrecorded areas are sometimes fragmented.

FIG. 4 schematically shows an example of such area-fragmented optical disk, in which an unrecorded area (A) and a further unrecorded area (B) exist, sandwiching a recorded area. FIG. 5A to FIG. 5C show time variations of buffer storage amount in the FE buffer, transfer rate from the BE buffer to the FE buffer, and write rate of the optical pickup, respectively, when video images are continuously recorded or written in the unrecorded area (A) and the unrecorded area (B) of the optical disk shown in FIG. 4. Since compressed and coded data alone are transferred between the BE buffer and the FE buffer of the optical disk recorder, the transfer rate between them is restricted to be lower as compared with those of e.g. so-called personal computers.

Initially, when the video recording starts, signals stored in the BE buffer are transferred to the FE buffer at a transfer rate Rt. The FE buffer has a threshold value (initial storage threshold value) M set therein which is smaller than the upper limit of its buffer capacity, so as to enable recovery by rewriting when a tracking error or a focusing error occurs due to e.g. vibrations applied to the optical disk recorder during writing of the signals. When the storage amount in the FE buffer reaches the threshold value M at time T11 due to the signal transfer from the BE buffer, the signals stored in the FE buffer are output to the optical pickup, and the writing is started. At this time, the signal transfer from the BE buffer to the FE buffer continues on. However, write rate Rw of the optical pickup is higher than the transfer rate Rt, so that the storage amount in the FE buffer gradually decreases, and becomes zero at time T12. Thereafter, the writing by the optical pickup is paused until the buffer storage amount reaches the threshold value M again. In this way, the broadcast signals are written to the optical disk in the optical disk recorder multiple times dividedly while being buffered by the BE buffer and the FE buffer.

As the video recording proceeds in this way, and the transfer, from the BE buffer to the FE buffer, of all the signals to be recorded or written in the unrecorded area (A) is completed at time T13, the transfer of the signals to the FE buffer temporarily ends. Since the optical pickup continues writing signals at the write rate Rw at this time as well (refer to FIG. 5C), the storage amount in the FE buffer abruptly decreases, and becomes zero at time T14, thereby ending the video recording in the unrecorded area (A). Thereafter, the optical pickup seeks to a position corresponding to the beginning of the unrecorded area (B), and then starts recording or writing in the unrecorded area (B).

Besides, an optical disk device is known which intermittently rotates an optical disk when the amount of information to be recorded or reproduced per unit time is less than a given threshold value (refer to e.g. Japanese Laid-open Patent Publication 2003-217227). A further known optical disk device selects a certain operation in accordance with a predetermined order of priority based on kinds of recording/reproducing operations so as to decide the operation to be performed next (refer to e.g. Japanese Laid-open Patent Publication 2002-203363). A still further known optical disk device sets the seek speed to low for normal recording, and switches the seek speed to high when the storage amount in a buffer exceeds a certain amount (refer to e.g. Japanese Laid-open Patent Publication 2003-281745).

However, the optical disk recorder in the prior art as first described above has the following problem. In it, there exists time interval $\Delta T$ between time T13 and time T14 during which only the writing is performed, so that the seek operation cannot immediately start at time T13 when the signal transfer is ended, causing the video recording to take a long time. Accordingly, it is required to store, in the BE buffer, broadcast signals received from time T13 to time T15 at which the signal transfer is resumed for writing in the unrecorded area (B). Hence, there is a possibility that the BE buffer overflows, causing video images and sounds to be interrupted. The above refers to the problem in the case of the video recording in the unrecorded area (A) and the unrecorded area (B) continuously as shown in FIG. 4 and FIGS. 5A to 5C. However, similar problem arises in the case of so-called "chasing playback" or simultaneous recording and reproduction, in which signals already recorded in the recorded area are reproduced while the recording in the unrecorded area (A) is performed. More specifically, in the case of the "chasing playback", it is not possible to immediately start the seek operation and then the reproduction operation at time T13 when the signal transfer is ended.

Such problem cannot be solved by any one of the devices as disclosed in the above patent publications.

SUMMARY OF THE INVENTION

An object of the present invention is to provide an optical disk recorder and a method of writing signal to an optical disk such that both the signal transfer from a BE buffer to a FE buffer and the signal writing by an optical pickup can be ended substantially simultaneously, thereby making it possible to reduce the write time.

According to a first aspect of the present invention, there is provided an optical disk recorder comprising: a tuner for receiving television broadcast signals; an encoder for compressing and coding the television broadcast signals received by the tuner; a first buffer for temporarily storing the signals compressed and coded by the encoder; a second buffer to receive the signals stored in and transferred from the first buffer for storing the transferred signals; an optical pickup for writing the signals stored in the second buffer to an optical disk by irradiating a laser beam onto the optical disk; and control means for controlling each of the tuner, the encoder, the first buffer, the second buffer and the optical pickup, wherein for video recording, the control means starts storing signals in the first buffer, and calculates an optimum storage threshold value of the second buffer from: data size of an area on the optical disk in which signals can be written continuously, or data size required for recording a television program; a signal transfer rate from the first buffer to the second buffer; and a signal write rate of the optical pickup to the optical disk, the control means starts storing the signals in the second buffer by transferring the signals stored in the first buffer to the second buffer, and the control means starts writing the signals to the optical disk by the optical pickup while continuing the buffer storage to the second buffer, when the buffer storage amount stored in the second buffer exceeds the optimum storage threshold value, whereby the control means substantially simultaneously ends both the signal transfer from the first buffer to the second buffer and the signal writing by the optical pickup, thereby reducing the write time.

According to the first aspect of the present invention, both the signal transfer from the first buffer to the second buffer and the signal writing by the optical pickup can be ended substantially simultaneously, so that it is possible to reduce the write time for writing signals continuously in fragmented multiple unrecorded areas. Thereby, the first buffer can be prevented from overflowing, improving the performance of the optical disk recorder for simultaneous recording and reproduction such as so-called "chasing playback".

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein.

DESCRIPTION OF THE PREFERRED EMBODIMENTS

The best mode and preferred embodiments of the present invention will be described hereinafter with reference to the annexed drawings.

Figure 1:
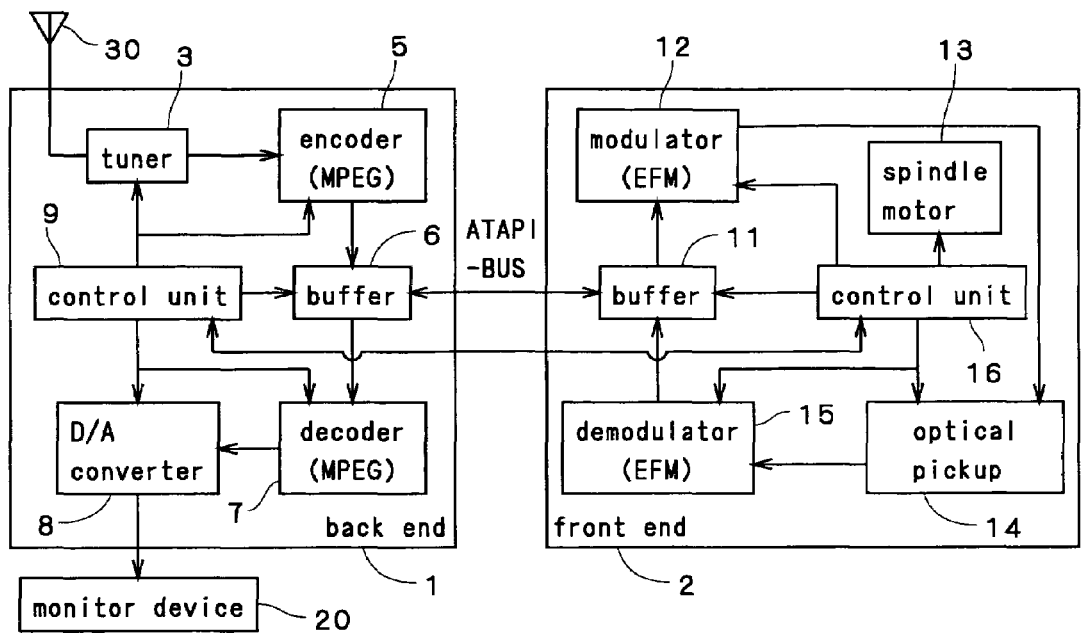
FIG. 1 is a schematic electric block diagram of an optical disk recorder according to an embodiment of the present invention.

FIG. 1 shows, as an example of an optical disk recorder, a configuration of a DVD (Digital Versatile Disk) recorder that records television broadcast signals on an optical disk (DVD). The optical disk recorder comprises a back end 1 for performing the process of the entire recorder, and a front end 2 for writing and reading data to and from the optical disk.

The back end 1 comprises: a tuner 3 for receiving television broadcast signals via an antenna 30; an MPEG (Moving Picture Experts Group) encoder 5 for compressing and coding the broadcast signals received by the tuner 3 into signals conforming to the MPEG standard; a BE buffer (first buffer) 6 for temporarily storing the signals compressed and coded by the MPEG encoder 5; an MPEG decoder 7 for decoding the signals stored in the BE buffer 6; a D/A (Digital-to-Analog) converter 8 for converting the signals decoded by the MPEG decoder 7 to analog signals which a monitor device 20 can output; a control unit (control means) 9 for controlling each part of the back end 1; a remote control device (not shown) for inputting various commands to the DVD recorder; a timer unit (not shown) for performing a process for timer recording; and so on. The tuner 3 can be for either digital broadcast or analog broadcast. In the case where the tuner 3 is for analog broadcast, an A/D (Analog-to-Digital) is additionally required.

On the other hand, the front end 2 comprises: a FE buffer (second buffer) 11 for sending and receiving signals to and from the BE buffer 6; an EFM (Eight Fourteen Modulation) modulator 12 for modulating signals (8-bit signals) stored in the FE buffer 11 to 14-bit signals that are suitable for writing to the optical disk; a spindle motor 13 for rotating the optical disk; an optical pickup 14 for writing and reading signals to and from the optical disk by irradiating a laser beam onto the optical disk while being rotated by the spindle motor 13; and EFM demodulator 15 for demodulating the 14-bit signals read by the optical pickup 14 to 8-bit signals; a control unit (control means) 16 to receive control signals output from the control unit 9 for controlling each part of the front end 2; and so on. In the present specification, the control unit 9 and the control unit 16 are collectively referred to as control means as well.

The control unit 9 of the back end 1 and the control unit 16 of the front end 2 are connected to be able to send and receive various control signals to and from each other, in which the BE buffer 6 and the FE buffer 11 are connected to be able to send and receive MPEG encoded signals to and from each other via e.g. an ATAPI-BUS (Advanced Technology Attachment Packet Interface Bus).

Figure 2A:
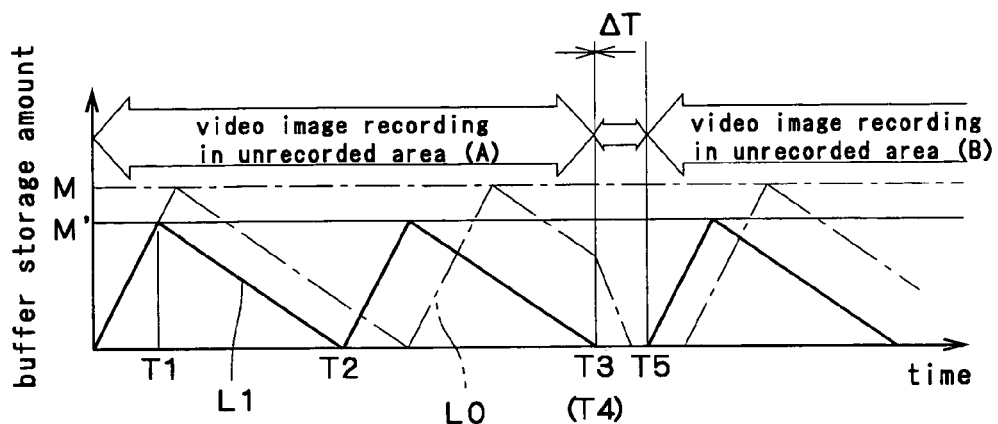
FIG. 2A to FIG. 2C are graphs showing time variations of storage amount in a front-end buffer, data transfer rate from a back-end buffer to the front-end buffer, and write rate of an optical pickup, respectively, when the optical disk recorder records video images.
Figure 2B:
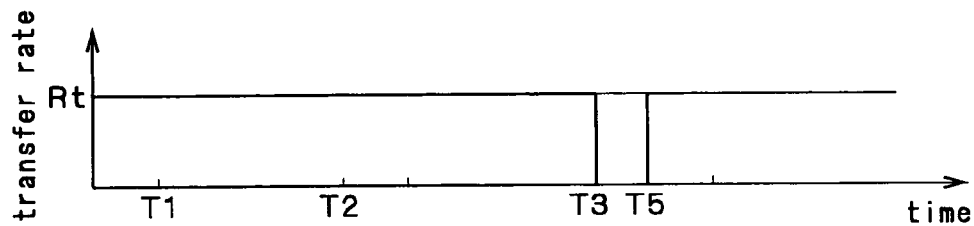
Figure 2C:
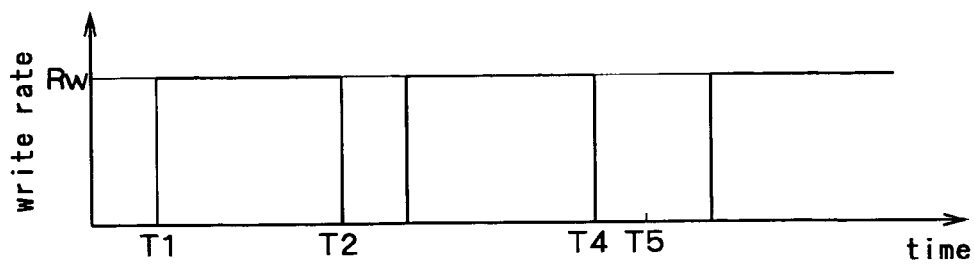
Figure 4:
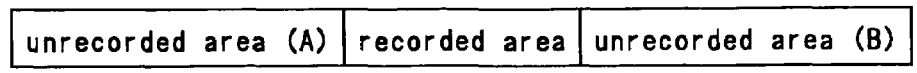
FIG. 4 is a schematic representation of an optical disk in which unrecorded areas are fragmented.

FIG. 2A to FIG. 2C show time variations of buffer storage amount in the FE buffer 11, transfer rate from the BE buffer 6 to the FE buffer 11, and write rate of the optical pickup 14, respectively, when video images are continuously recorded or written in the unrecorded area (A) and the unrecorded area (B) of the area-fragmented optical disk shown in FIG. 4. In FIG. 4, it is assumed that the direction from left to right, namely from the unrecorded area (A) to the further unrecorded area (B), which is a moving direction of the optical pickup 14 or writing direction, extends to the outer circumference of the optical disk as shown by an arrow in FIG. 4.

Figure 5A:
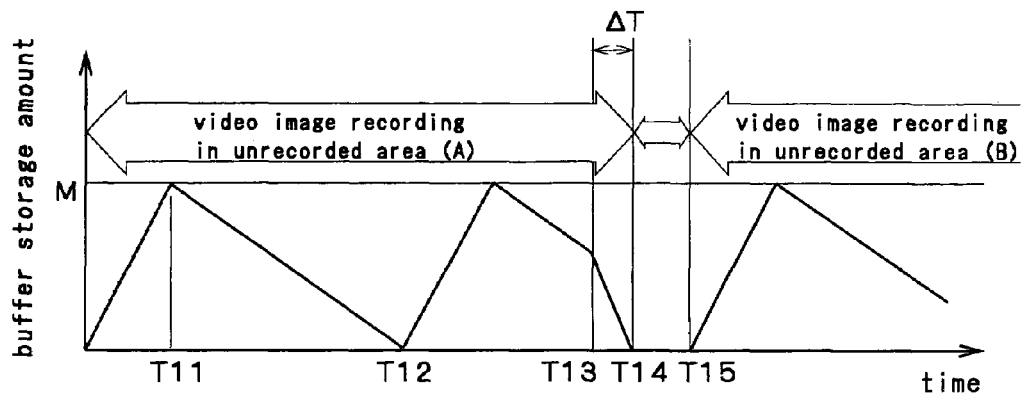
FIG. 5A to FIG. 5C are graphs showing time variations of storage amount in a front-end buffer, data transfer rate from a back-end buffer to the front-end buffer, and write rate of an optical pickup, respectively, when a conventional optical disk recorder records video images.
Figure 5B:
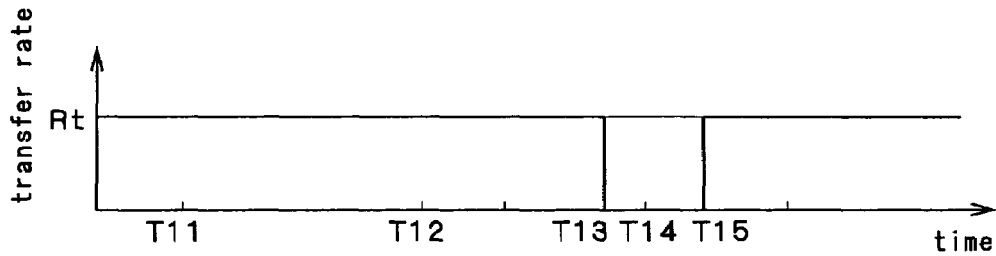
Figure 5C:
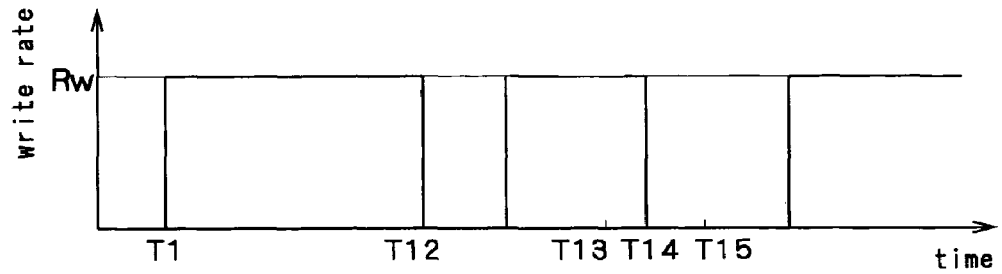

Initially, when the video recording starts, signals are transferred from the BE buffer 6 to the FE buffer 11 at a transfer rate Rt. Similarly as in the conventional optical disk recorder as described above using FIGS. 5A to 5C, the FE buffer 11 has a storage threshold value M initially set therein which is smaller than the upper limit of its buffer capacity, so as to enable recovery by rewriting when a tracking error or a focusing error occurs due to e.g. vibrations applied to the DVD recorder during writing of the signals. In FIG. 2A, dash-dotted line L0 represents buffer storage amount in the case where the timing of writing by the optical pickup is controlled using the storage threshold value M, while solid line L1 represents buffer storage amount in the case where the timing of writing by the optical pickup is controlled using later described optimum threshold value M'.

In the present embodiment, both the signal transfer from the BE buffer 6 to the FE buffer 11 and the signal writing by the optical pickup 14 are ended by the control means substantially simultaneously. More specifically, time interval ΔT is made close to zero between time T3, at which the signal transfer from the BE buffer 6 to the FE buffer 11 is ended, and time T4 at which the signal writing by the optical pickup 14 is ended, thereby making it possible to reduce total write time.

The time interval ΔT can be made close to zero by changing the storage threshold value of the buffer to optimum storage threshold value M' which is smaller than the initial storage threshold value M. More specifically, when the storage amount in the FE buffer reaches the optimum threshold value M' (time T1) due to the signal transfer from the BE buffer 6, the signals stored in the FE buffer 11 are output to the optical pickup 14 via the EFM modulator 12, and the writing is started. At this time, the signal transfer from the BE buffer 6 to the FE buffer 11 continues on. However, since write rate Rw of the optical pickup 14 is higher than the transfer rate Rt, the storage amount in the FE buffer 11 gradually decreases, and becomes zero at time T2.

By performing the writing multiple times each when the storage amount reaches the optimum threshold value M' while continuing the buffer storage to the FE buffer 11, the time T3 at which the signal transfer from the BE buffer 6 to the FE buffer 11 is ended can be made substantially simultaneous with the time T4 at which the signal writing by the optical pickup 14 is ended. Thereafter, by feeding the optical pickup 14 to seek the unrecorded area (B), the storing of data for writing in the unrecorded area (B) is resumed at time T5.

For reducing the write time, it is desired that the above time interval ΔT (=T4−T3) be as close to zero as possible. However, precisely speaking, the transfer rate Rt and the write rate Rw are not constant, so that it is difficult to always keep ΔT zero. Thus, the present embodiment sets the optimum threshold value M' so as to make the time interval ΔT shorter than a predetermined time interval.

Next, a procedure for calculating the optimum threshold value M' will be described. The calculation of the optimum threshold value M' is performed by the control means (the control unit 9 or the control unit 16). Referring to FIGS. 2A to 2C, the write time per cycle is M/(Rw−Rt), so that the amount of data written by the optical pickup 14 during one cycle can be obtained by Rw×M/(Rw−Rt). Assuming that the data size of the unrecorded area (A) is A, the number of writes N is calculated using the following equation (1):

$$N=(A/M)\times[(Rw-Rt)/Rw] \quad (1)$$

Here, if the right-hand side of the equation (1) can be divided by an integer, or if the fraction of the right-hand side of the equation (1) is smaller than a predetermined value, the time interval ΔT can be considered to be shorter than the predetermined time interval. Accordingly, the optimum threshold value M' is calculated using the following equation (2):

$$M'=M \quad (2)$$

On the other hand, if the fraction of the right-hand side of the equation (1) is equal to or larger than the predetermined value, the optimum threshold value M' is calculated using the following equation (3):

$$M'=[A/(N+1)]\times[(Rw-Rt)/Rw] \quad (3)$$

The foregoing has described the case of continuous video recording in the unrecorded area (A) and the unrecorded area (B) of the area-fragmented optical disk, but can be applied as well to the case where the unrecorded area (A) of the optical disk is larger than the data size required for recording a television program. In such case, the optimum threshold value M' can be calculated by substituting a data size, required for recording the television program, for the data size A of the unrecorded area (A) in the above equations.

Figure 3:
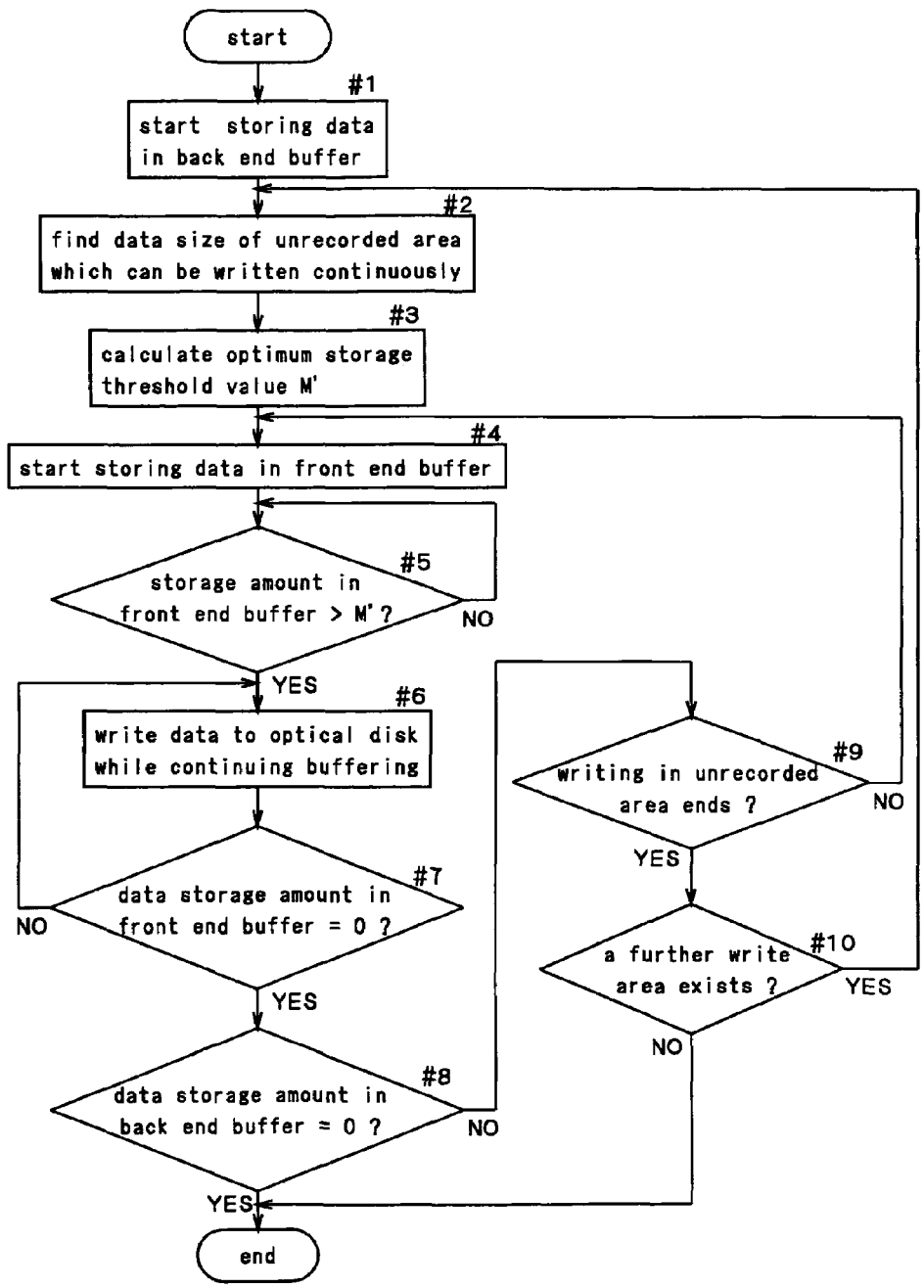
FIG. 3 is a flow chart showing an operation of the optical disk recorder for video recording.

Referring to FIG. 3, the following will describe an operation of the optical disk recorder for recording a television program in the unrecorded areas (A) and (B). When a recording button is switched on, the optical disk recorder starts storing data in the BE buffer 6 (#1). Here, the data to be stored in the BE buffer 6 are broadcast signals that are received by the tuner 3 and are compressed and coded by the encoder 4. Then by feeding the optical pickup 14, the optical disk recorder finds the data size of an area (unrecorded area or write area (A)) on the optical disk in which data can be written continuously (#2). The optimum storage threshold value M' is calculated using the above equations (1) to (3) (#3). Thereafter, the optical disk recorder transfers the data stored in the BE buffer 6 to the FE buffer 11, and starts storing the data in the FE buffer 11 (#4).

When the data storage amount in the FE buffer 11 exceeds the optimum storage threshold value M' (YES in #5), the optical disk recorder drives the optical pickup 14 to write data to the optical disk (#6). This causes the data storage amount in the FE buffer 11 to decrease. The optical disk recorder repeats the data writing until the data storage amount in the FE buffer 11 becomes zero (NO in #7), and the process shifts to step #8 when the data storage amount in the FE buffer 11 becomes zero. When the data storage amount in the BE buffer 6 becomes zero (YES in #8) because, for example, the television program to be recorded ends, the optical disk recorder ends the process of the operation. While the data storage amount in the BE buffer 6 is not zero because, for example, the television program to be recorded does not end (NO in #8), the process shifts to step #9, and the optical disk recorder repeats the steps #4 to #8 until all the writing in the unrecorded area (A) ends (NO in #9). When all the writing in the unrecorded area (A) ends (YES in #9), the process of the operation of the optical disk recorder shifts to step #10, and the optical disk recorder searches for a further write area (unrecorded area (B)). If there exists a further write area (YES in #9), the process of the operation of the optical recorder returns to step #2, whereas if there exists no further write area (NO in #9), the optical disk recorder ends the process of the operation.

As described hereinabove, according to the present embodiment, both the signal transfer from the BE buffer 6 to the FE buffer 11 and the signal writing by the optical pickup 14 can be ended substantially simultaneously. Accordingly, it is possible to reduce the write time for writing signals continuously in fragmented multiple unrecorded areas. Thereby, the BE buffer 6 can be prevented from overflowing, and the reproduction for simultaneous recording and reproduction can be performed quickly, improving the performance of the optical disk recorder. In addition, since it is possible to calculate the optimum storage threshold value M' of the FE buffer 11 in accordance with the data size, the signal transfer rate and the signal write rate, it becomes possible to allow the time T4, at which the signal writing by the optical pickup 14 is ended, to be further close to the time T3 at which the signal transfer from the BE buffer 6 to the FE buffer 11 is ended.

It is to be noted that the present invention is not limited to the above embodiment, and various modifications are possible. For example, the calculation of the optimum storage threshold value M' is not limited to that using the equations (1) to (3), but can be based on a different calculation method using e.g. the data size A, the signal transfer rate Rt and the signal write rate Rw. Furthermore, if approximate data size required for recording a television program is already known as e.g. in the case of timer recording, and if such data size is smaller than the data size A, such data size can be used instead of the data size A for calculating the optimum storage threshold value M'. Besides, the encoder 5 and the decoder 7 are not required to conform to the MPEG standard, but can be those conforming to a different standard.

The present invention has been described above using presently preferred embodiments, but such description should not be interpreted as limiting the present invention. Various modifications will become obvious, evident or apparent to those ordinarily skilled in the art, who have read the description. Accordingly, the appended claims should be interpreted to cover all modifications and alterations which fall within the spirit and scope of the present invention.

What is claimed is:

1. An optical disk recorder comprising:
   a tuner for receiving television broadcast signals;
   an encoder for compressing and coding the television broadcast signals received by the tuner;
   a first buffer for temporarily storing the signals compressed and coded by the encoder;
   a second buffer to receive the signals stored in and transferred from the first buffer for storing the transferred signals;
   an optical pickup for writing the signals stored in the second buffer to an optical disk by irradiating a laser beam onto the optical disk; and
   control means for controlling each of the tuner, the encoder, the first buffer, the second buffer and the optical pickup,
   wherein for video recording,
   the control means starts storing signals in the first buffer, and calculates an optimum storage threshold value of the second buffer from: data size of an area on the optical disk in which signals can be written continuously, or data size required for recording a television program; a signal transfer rate from the first buffer to the second buffer; and a signal write rate of the optical pickup to the optical disk,
   the control means starts storing the signals in the second buffer by transferring the signals stored in the first buffer to the second buffer, and
   the control means starts writing the signals to the optical disk by the optical pickup while continuing the buffer storage to the second buffer, when the buffer storage amount stored in the second buffer exceeds the optimum storage threshold value,
   whereby the control means substantially simultaneously ends both the signal transfer from the first buffer to the second buffer and the signal writing by the optical pickup, thereby reducing the write time.

2. The optical disk recorder according to claim 1, wherein for calculating the optimum storage threshold value of the second buffer, the control means uses the following equation (2) if fraction of number of writes as calculated by the following equation (1) is smaller than a predetermined value, while the control means uses the following equation (3) if fraction of number of writes as calculated by the following equation (1) is equal to or larger than the predetermined value:

$$N=(A/M)\times[(Rw-Rt)/Rw] \quad (1)$$

$$M'=M \quad (2)$$

$$M'=[A/(N+1)]\times[(Rw-Rt)/Rw] \quad (3)$$

where N is number of writes, A is data size of the area on the optical disk in which the signals can be written continuously, Rt is signal transfer rate from the first buffer to the second buffer, Rw is signal write rate of the optical pickup to the optical disk, M is an initial storage threshold value of the second buffer, and M' is the optimum storage threshold value of the second buffer.

3. A method of writing data to an optical disk comprising the steps of:
   receiving television broadcast signals;
   compressing and coding the received television broadcast signals;
   temporarily storing, in a first buffer, the compressed and coded signals;
   transferring the signals stored in the first buffer to a second buffer;
   writing the signals stored in the second buffer to an optical disk by irradiating a laser beam onto the optical disk using an optical pickup; and
   calculating an optimum storage threshold value of the second buffer from (a) data size of an area on the optical disk in which signals can be written continuously, or data size required for recording a television program, (b) a signal transfer rate from the first buffer to the second buffer, and (c) a signal write rate of the optical pickup to the optical disk,
   wherein the method further comprises the step of:
   starting writing the signals to the optical disk by the optical pickup while continuing the buffer storage to the second buffer, when the buffer storage amount stored in the second buffer exceeds the optimum storage threshold value, thereby substantially simultaneously ending both the signal transfer from the first buffer to the second buffer and the signal writing by the optical pickup, and thereby reducing the write time.

4. The method of writing data to an optical disk according to claim 3, wherein for calculating the optimum storage threshold value of the second buffer, the following equation (2) is used if fraction of number of writes as calculated by the following equation (1) is smaller than a predetermined value, while the following equation (3) is used if fraction of number of writes as calculated by the following equation (1) is equal to or larger than the predetermined value:

$$N=(A/M)\times[(Rw-Rt)/Rw] \quad (1)$$

$$M'=M \quad (2)$$

$$M'=[A/(N+1)]\times[(Rw-Rt)/Rw] \quad (3)$$

where N is number of writes, A is data size of the area on the optical disk in which the signals can be written continuously, or data size required for recording the television program, Rt is signal transfer rate from the first buffer to the second buffer, Rw is signal write rate of the optical pickup to the optical disk, M is an initial storage threshold value of the second buffer, and M' is the optimum storage threshold value of the second buffer.

* * * * *